United States Patent [19]

Leiber et al.

[11] Patent Number: 5,070,699
[45] Date of Patent: Dec. 10, 1991

[54] ROCKER-ACTUATED TWIN MASTER CYLINDER

[75] Inventors: Heinz Leiber, Oberriexingen; Manfred Steiner, Stuttgart, both of Fed. Rep. of Germany

[73] Assignee: Mercedes-Benz AG, Fed. Rep. of Germany

[21] Appl. No.: 575,667

[22] Filed: Aug. 31, 1990

[30] Foreign Application Priority Data

Aug. 31, 1989 [DE] Fed. Rep. of Germany ....... 3928873

[51] Int. Cl.$^5$ ............................................. B60T 11/20
[52] U.S. Cl. ......................................... 60/581; 60/594
[58] Field of Search .................................. 60/594, 581

[56] References Cited

U.S. PATENT DOCUMENTS 3,278,240 10/1966 Boyd .................................. 60/581 X
3,371,487 3/1968 Stelzer .............................. 60/594 X
4,586,590 5/1986 Rishel et al. ......................... 188/345

FOREIGN PATENT DOCUMENTS 1655266 1/1971 Fed. Rep. of Germany .
488032 12/1936 United Kingdom .

Primary Examiner—Edward K. Look
Assistant Examiner—George Kapsalas
Attorney, Agent, or Firm—Evenson, Wands, Edwards, Lenahan & McKeown

[57] ABSTRACT

A twin master cylinder for a road vehicle brake system has master cylinders assigned respectively, to a front-axle brake circuit and to a rear-axle brake circuit. The master cylinders are arranged laterally next to one another in a common housing and are each actuable via an arm of a pivotable rocker with a variable ratio L1/L2 of the lengths L1 and L2 of arms of the rocker. A supporting element is provided which, by its support point on the pivotable rocker, marks the pivot axis of the rocker and, by support on a push-rod piece, transmits the actuating force acting on piece to the rocker. The supporting element is arranged between the rocker and the supporting surface of the push-rod so as to be displaceable transversely relative to the direction of exertion of the actuating force. A hydraulic drive cylinder serving as an automatic actuating drive coupled to the supporting element via a link and, when subjected to the front-axle brake pressure, causes the link and consequently the supporting element to experience lateral deflection which change the ratio L1/L2 of the lengths of the rocker arms.

31 Claims, 4 Drawing Sheets

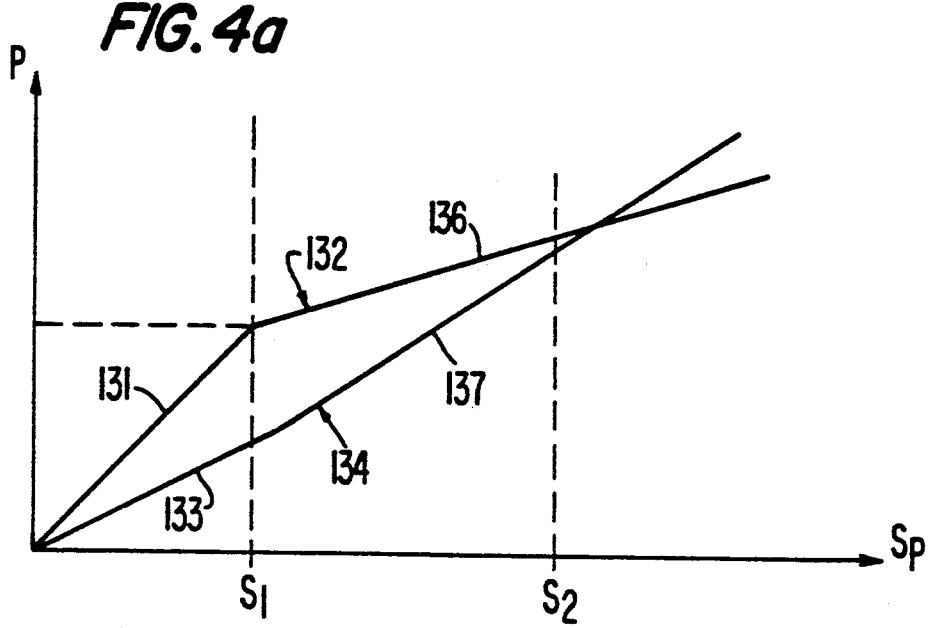
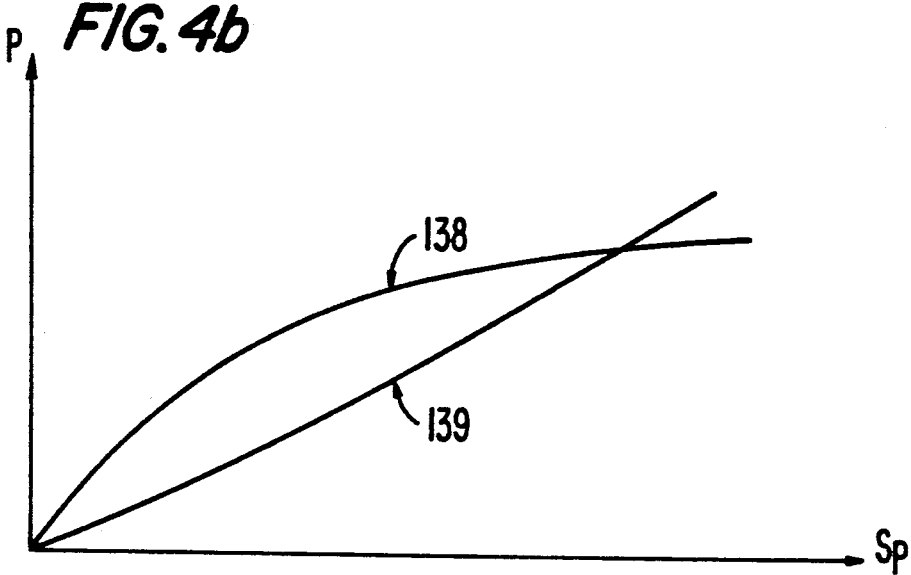

ROCKER-ACTUATED TWIN MASTER CYLINDER

BACKGROUND OF THE INVENTION

The present invention relates to a twin master cylinder for a road vehicle hydraulic dual-circuit brake system and, more particularly, to such a system having a front-axle/rear-axle brake-circuit allocation, with master cylinders which are assigned respectively to a front-axle brake circuit and to the rear-axle brake circuit and which are arranged at a lateral distance next to one another in a common housing, with their central longitudinal axes extending in parallel. Each master cylinder is actuable via an arm of a pivotable rocker acting as a two-armed lever and with a variable ratio defined by the lengths of the rocker arms.

A twin master cylinder is described in German Offenlegungsschrift 1,655,266. In the conventional twin master cylinder, an actuating force acting on a rocker with a pedal step-up ratio is transmitted via a pedal tappet which is supported with its hemispherical end on a complementary hemispherical bottom of a conical sleeve. The sleeve widens on the pedal side and is inserted into a conical rocker recess of a form complementary to its outer contour. The actuating force exerted on the rocker in the axial direction is transmitted to the master-cylinder pistons via slender tappets which are supported with their hemispherical ends on the rocker side in conical recesses of the rocker and with their ends on the piston side in conical recesses of the master-cylinder pistons.

To make it possible to vary the ratio L1/L2 of effective lengths, L1 and L2, of the rocker arms which is determined by the radial distances of the supporting points of the tappets engaging on the master-cylinder piston from the supporting point of the pedal tappet on the rocker, the conical sleeve located on the pedal side has a symmetry differing from the axial symmetry and its arranged rotatably in the conical rocker recess of a form complementary to its outer contour. The master cylinder can thereby be set to a restricted extent to different values of the ratio of the brake forces which can be exerted via the two brake circuits. A setting made in this respect, for example to take into account a constructively predetermined axle-load ratio, is not subsequently changeable.

A setting of the ratio L1/L2 of the rocker-arm lengths taking into account different load states of the vehicle and different axle-load distributions resulting from these different load states so that relatively high rear-axle brake-force fractions can be utilized when the vehicle is fully loaded is not possible, at least not in a simple way.

SUMMARY OF THE INVENTION

An object of the present invention is, therefore, to provided a twin master cylinder in which a need-related setting and/or variation of the brake-force distribution is possible, even during motoring, by virtue of a simply actuable drive.

This object has been achieved in accordance with the present invention by the provision of a supporting element which, by its supporting point on the rocker, marks the pivot axis of the rocker and, by support on a push-rod piece, transmits the actuating force acting on this piece to the rocker. The supporting element is arranged between the rocker and the supporting surface of the push-rod piece so as to be displaceable transversely relative to the direction of exertion of the actuating force and to the axial direction of the master-cylinder longitudinal axes. A hydraulic drive cylinder is coupled to the supporting element via a link. When subjected to the pressure, the hydraulic cylinder causes the link and consequently the supporting element to experience a lateral deflection. An increase of the lateral deflection is linked to a reduction of the ratio L1/L2 of the lengths L1 and L2 of the rocker arms, via which the actuating force is allocated to that master-cylinder piston of the twin master cylinder assigned to the front-axle brake circuit or to that master-cylinder piston of the twin master cylinder assigned to the rear-axle brake circuit.

The marking of the pivot axis of the rocker by its support on a supporting element, which is itself supported laterally displaceably on a push-rod piece causing the actuating force to be introduced into the twin master cylinder, and the articulated coupling of the supporting element to a hydraulic drive cylinder, which, when subjected to pressure, can control lateral deflections of the supporting element and therefore variations of the rocker-arm length ratio L1/L2, afford in a simple way the possibility of dynamically influencing the brake-force distribution according to the particular need, in a presently preferred embodiment of the twin master-cylinder according to the present invention, because the front-axle brake pressure is fed as the drive pressure into the hydraulic drive cylinder controlling the deflections of the supporting element. As a result, with an increasing front-axle brake pressure, a constantly decreasing rear-axle brake-force fraction is obtained which is beneficial during braking for a stable braking behavior of the vehicle because of the dynamic axle-load shift to the front axle.

In the event that the vehicle is equipped with a hydraulic brake booster, the drive-pressure space of the drive cylinder can be subjected to the outlet pressure proportional to the force with which the driver actuates the brake pedal. This method for activating the drive cylinder is especially advantageous, because no further load has to be connected to the master cylinder assigned to the front-axle brake circuit.

A similar advantage is obtained by subjecting the drive-pressure space of the drive cylinder to the outlet pressure of an auxiliary-pressure source for supplying control pressure of the drive cylinder controlling the deflections of the support element A control valve for effecting this purpose is in the form of a simple two-position change-over valve and is actuatable by the outlet pressure of the master cylinder assigned to the front-axle brake circuit or as an electrically actuable solenoid valve. In a pressure-controlled valve embodiment, the valve is switched into its throughflow position when a threshold value of the front-axle brake pressure is exceeded making the connection of the drive cylinder to the pressure outlet of the auxiliary-pressure source, and is switched back into its basic position again only after the front-axle brake pressure has fallen below a threshold value which is lower than the response threshold value. In the solenoid valve embodiment, the change-over valve can be controlled, for example, by output signals of a path transmitter or by path switch monitoring the position of the piston of the master cylinder assigned to the front-axle brake circuit; if the vehicle is equipped with a anti-lock system, this control can occur by actuation signals which are obtained from an evaluation of the output signals of the wheel-speed sensors of the anti-lock system, which signals are a measure of the respective vehicle deceleration.

There is another advantage in configuring the control valve as an electrically actuable solenoid valve as a 3/3 valve which can be moved into a shut-off position and which, for example by a pulsed activation of the control valve, allows a virtually continuous change of the pressure in the drive cylinder and therefore also a correspondingly finely graded change of the positions of the supporting element.

Other features of the present invention include restoring springs of the drive cylinder which can be used, alternatively or in combination, to achieve a desired pedal-travel/brake-pressure characteristic and an approximation of the brake-force distribution.

The arrangement of the central longitudinal axis of the drive cylinder in the same plane as the central longitudinal axes of the two master cylinders but at right angles to these axes has a benefit that only one "draw" link is required for the drive coupling between its piston rod and the supporting element. In contrast, an arrangement of the drive cylinder with its longitudinal axis extending in parallel with the longitudinal axes of the master cylinders of the twin master cylinder, in combination with a simply produced deflection device, has the advantage of a somewhat smaller space requirement.

Another feature of the present invention is directed to a presently preferred configuration of the supporting element, as a result of which the frictional resistance counteracting the displacement movements of the supporting element is especially low, so that the drive cylinder can be designed for a relatively low drive power. To this end, the supporting element is supported on a plane end face of the push-rod piece via two freely rotatable support rollers whose rotation axes are arranged mid-planes of the supporting element containing the axis of radiation of the roller located on the same side as the rocker.

A longitudinal offset between the link pivot shaft located on the same side as the drive cylinder and the supporting point of the supporting element of the twin master cylinder on the same side as the rocker ensures that its restoring springs acting on the master-cylinder pistons can, in the non-actuated state of the brake system, force the displaceable functional elements of the twin master cylinder back into the respective basis positions and keep them in these positions.

By way of path transmitters or path switches and evaluation circuits assigned thereto, a functional monitoring of the twin master cylinder can be achieved in a simple technical manner, and warning signals characteristic of malfunctions of said twin master cylinder can be triggered.

BRIEF DESCRIPTION OF THE DRAWINGS

These and other objects, functions and advantages of the present invention will become more apparent from the following detailed description of presently preferred embodiments when taken in conjunction with the accompanying drawings wherein:

FIGS. 4a and 4b are pedal-travel/brake-pressure graphs to explain special designs of a twin master cylinder according to the embodiments FIGS. 1 to 3.

DETAILED DESCRIPTION OF THE PREFERRED EMBODIMENTS

Figure 1:
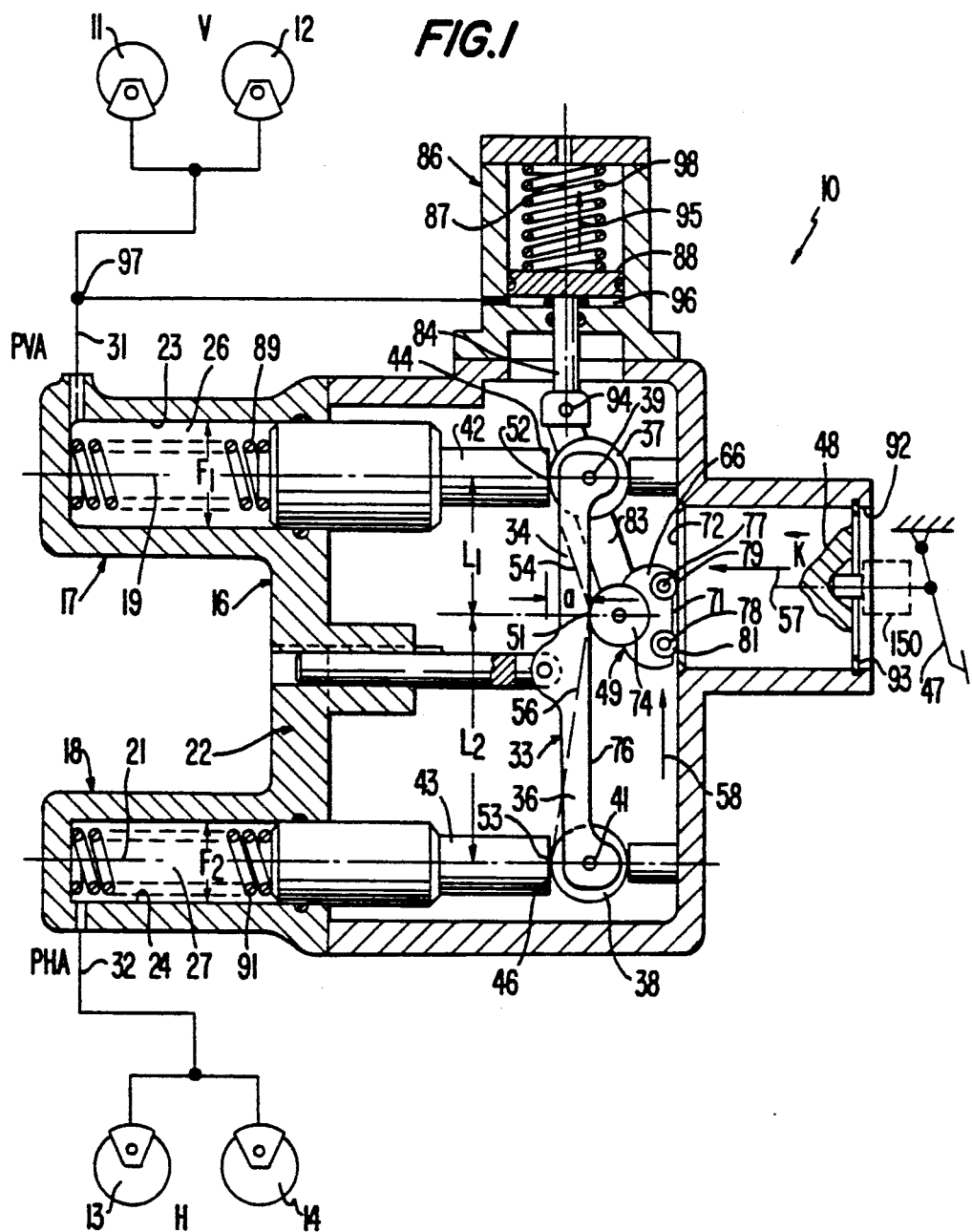
FIG. 1 is a partial cross-sectional view of a first exemplary embodiment of a twin master cylinder actuable by brake pressure for controlling the front-axle/rear-axle brake-force distribution.

FIG. 1 illustrates a dual-circuit brake system designated generally by the numeral 10 for a road vehicle in which the front-wheel brakes 11, 12 are combined to form a front-axle (V) brake circuit I and the rear-wheel brakes 13, 14 are combined to form a rear-axle (H) brake circuit II. As a brake unit, there is a twin master cylinder designated generally by the numeral 16 comprising two master cylinders 17, 18 which are each assigned to one of the two brake circuits I and II and which, lying laterally next to one another with their central longitudinal axes 19, 21 extending in parallel, are accommodated in a common housing 22. The master-cylinder bores 23, 24 form the boundaries, fixed relative to the housing 22, of the outlet-pressure space 26 assigned to the front-axle brake circuit I and of the outlet pressure space 27 assigned to the rear-axle brake circuit II. Each of the bores 23, 24 is limited movably on one side by, in each case, one master-cylinder piston 28, 29 guided displaceably in a pressure-tight manner in the respective master-cylinder bore 23, 24, and has different cross-sectional surfaces F1, F2. The ratio, F1/F2, corresponds approximately to the ratio Vv/Vh of the brake-fluid volumes Vv and Vh which, during a braking operation in which a mean vehicle deceleration is obtained, are positively displaced out of the front-axle outlet-pressure space 26 and the rear-axle outlet-pressure space 27, respectively, of the brake unit 16 into the main brake lines 31, 32 of the front-axle brake circuit I and of the rear-axle brake circuit II, respectively.

For actuating the two master-cylinder pistons 28 and 29, there is a rocker, designed generally by the numeral 33 having two lever arms 34, 36 with, in each case one respective support roller 37, 38. The support rollers 37, 38 are freely rotatable about respective axes 39, 41 extending perpendicularly relative to the plane marked by the central longitudinal axes 19, 21 of the master cylinders 17, 18, and are supported on rear tappet-like extensions 42, 43 of the respective master-cylinder pistons 28, 29 and can roll on the respective plane end faces 44, 46 of the extensions 42, 43.

The actuating force controlled by the actuation of the brake pedal 47, increased by a conventional brake booster 150 schematically shown and acting on a piston-shaped push-rod piece 48 is transmitted to the rocker 33 via a supporting element, designated generally by the numeral 49. The supporting element 49 ensures the mutual axial support of the rocker 33 and of the push-rod piece 48. The engaging or supporting position of the supporting element 49 located between the axes of rotation 39, 41 of the two support rollers 37, 38 is variable, with the result that it is also possible to vary the ratio L1/L2 of the lever-arm lengths L1, L2 of the rocker 33. The total length L1+L2 of the rocker 33 corresponds to the distance between the axes of rotation 39, 41 of the support rollers 37, 38.

The effective lengths L1 and L2 of the rocker arms 34, 36, which are supported via the support rollers 37, 38 at the supporting points 52, 53 on the end faces 44, 46 of the tappet-like extensions 42, 43 of the master-cylinder pistons 28, 29 respectively, are determined by the length of the projections of the straight lines 54, 56, which connect the supporting element 49 on the rocker 33, in a straight line extending at right angles to the central axes 19, 21 of the master cylinders 17, 18. The actuating force K exerted in the direction of the arrow 57, parallel to the central longitudinal axes 19, 21 of the master cylinders 17, 18, at the supporting point 51 of the supporting element 49 on the rocker 33, is allocated to the master-cylinder pistons 28, 29 in the ratio L2/L1 of the rocker-arm lengths, the larger fraction being transmitted to that piston, in the illustrated embodiment the piston 28 of the front-axle master cylinder 17, which is actuable via the shorter rocker arm 34.

As a result of a shortening of this rocker arm 34 by displacement of the supporting element 49 in the direction of the arrow 58, therefore, the brake pressure PVA in the front-axle brake circuit I can be increased in relation to the pressure PHA in the rear-axle brake circuit II. Consequently, for example, the dynamic axle-load shift to the front axle which occurs during a braking operation can be taken into account in relation to the particular need, with the effect of the increase in the front-axle brake-force fraction.

So that the foregoing displacement of the supporting element 49 can be carried out with as low frictional losses as possible and with correspondingly low drive forces, in the illustrated embodiment there are, in particular, the following constructed features, for an explanation of which reference will now be made to FIG. 2.

The rocker 33 consists of two parallel longitudinal members 61, 62 which are essentially in the form of a flat bar and between which the support rollers 37, 38 of the rocker 33 are mounted freely rotatably. The supporting element 49 comprises a rectangular frame designated generally by the numeral 63, and which has longitudinal walls 64, 66 extending parallel to the longitudinal members 61, 62 of the rocker 33 and connected firmly to one another by means of transverse spars 67, 68.

The rocker 33 and the supporting element 49 are symmetrical in relation to the transverse midplane 69 of the brake unit 16 containing the central longitudinal axes 19, 21 of the master cylinder 17, 18. As can be seen from the side view of related FIG. 1, the longitudinal walls 64, 66 of the frame 63 have approximately triangular shape and are arranged with their base end faces 71 parallel to the plane end face 72 of the push-rod piece 48 which face 72 extends at right angles to the transverse mid-plane 69, so as to extend at a distance, while the vertex regions of the longitudinal walls 64, 66 of the frame 63 point towards the rocker 33.

Between the vertex regions of the longitudinal walls 64, 66 of the frame 63, a support roller 74 is mounted freely rotatably about an axis 73 extending at right angles to the transverse mid-plane 69. The support roller 74 is supported on those parallel longitudinal end faces 76 of the longitudinal members 61, 62 of the rocker facing it and can roll on these end faces. Two further support rollers 79, 81 are mounted between the base regions of the frame longitudinal walls 64, 66 so as to be freely rotatable about axes 77, 78 extending parallel to the axis of rotation 73 of the support roller 74, by means of which the supporting element 49 is supported on the end face 72 of the push-rod piece 48 and can roll on this end face 72. The length of the support roller 74 located in the same side as the rocker, as measured along the axis of rotation 73, is calculated so that it can be supported over the entire width of the longitudinal end faces 76 of the longitudinal members 61, 62 of the rocker. The length of the support rollers 79, 81 located near the base, as measured in the corresponding direction, can be smaller.

Figure 2:
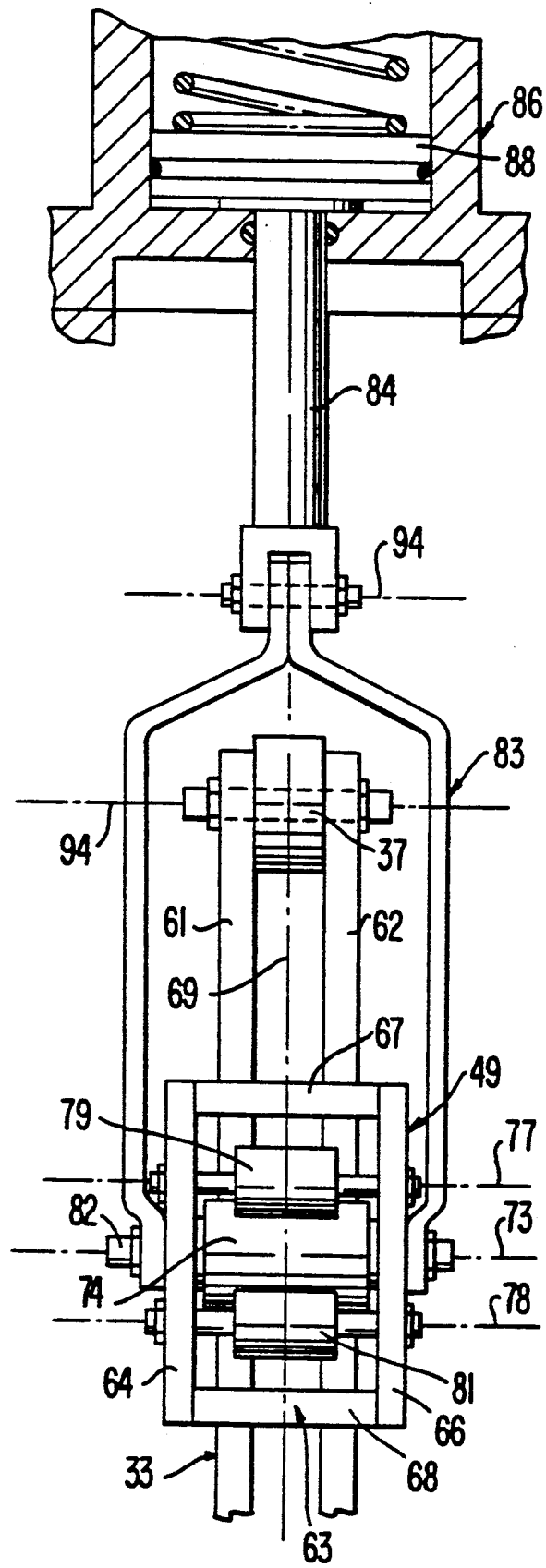
FIG. 2 is a detailed side view of the support element of FIG. 1, by the displacement of which in relation to the rocker of the master cylinder, the brake-force distribution can be changed.

The bearing shaft 82 of the support roller 74 is located on the same side as the rocker 33 and is, at the same time, also the pivot shaft of a joint, via which a link 83, fork-shaped in the representation of FIG. 2, is connected to the supporting element 49 in an articulated manner. The link 83 is articulated on the free end of a piston rod 84 of a hydraulic drive cylinder which is designated in general by the numeral 86 and which is provided as a servo-motor for the displacement of the supporting element 49 in order to change the rocker-arm length ratio L1/L2.

In the embodiment illustrated in FIGS. 1 and 2, the hydraulic valve cylinder 86 is arranged laterally next to the rocker 33, in such a way that its central longitudinal axis 87, in the direction of which the possible displacement of its piston 88 takes place, extends in the transverse mid-plane 69 of the brake unit 16 and at right angles to the central longitudinal axis 19 of the front-axle master cylinder 17. The basic position of the master-cylinder pistons 28, 29, the rocker 33 and the push-rod piece 48, is shown in FIG. 1 and corresponds to the non-actuated state of the brake system 10. These elements are forced into the basic position by the piston restoring springs 89, 91, this basic position being marked by the rearward bearing of the push-rod piece 48 against a spring ring 93 inserted into its guide bore 92. The pivot axis 94 of the joint coupling the link 83 to the piston rod 84 of the hydraulic drive cylinder 86 has, relative to the supporting point 51 of the support roller 74 of the supporting element 49 located on the same side as the rocker, as seen parallel to the central longitudinal axes 19, 21 of the master cylinder 17, 18 of the brake unit 16, an axial offset a which, in the embodiment illustrated as a presently preferred example, amounts to approximately 1/5 of the maximum possible actuating stroke of the push-rod piece 48. In the basic position, the central longitudinal axis 87 of the drive cylinder 86 extends between the supporting points 51 of the supporting points 52, 53 of the rocker 33 and of its support rollers 37, 38 on the pistons.

In the basic position of the thus far explained elements of the brake unit and their function, corresponding to the non-actuated state of the brake system 10, the piston 88 of the drive cylinder 86 assumes its position which corresponds to a minimum volume of its drive-pressure space 96 and in which the piston rod 84 is extended the furthest. In the basic position, the supporting element 49 assumes a position corresponding approximately to the highest possible value of the length L1 of the rocker arm 34 of the rocker 33 which engages on the piston 28 of the front-axle master cylinder.

In the embodiment illustrated, the drive-pressure space 96 of the drive cylinder 86 is connected to the pressure outlet 97 of the front-axle master cylinder 17, so that, when the brake system is actuated, the brake pressure PVW built up in the outlet-pressure space 23 of the front-axle master cylinder 17 is also fed into the drive-pressure space 96 of the drive cylinder 86. The piston 88 of the drive cylinder 86 is thereby displayed counter to the effect of a restoring spring 98 in the direction of the arrow 95. Thus, with the effect of an increase of its distance from the rocker 33, this piston displacement also is transmitted, via the link 83, to the supporting element 49, with the result that, with an increase in brake pressure in the front-axle brake circuit I, the effective length L1 of the rocker arm 34 engaging on the piston 28 of the front-axle master cylinder decreases. As a result of this decrease, an increasingly large proportion of the actuating force acts on the piston 28 of the front-axle master cylinder 17. The actuating stroke of the drive cylinder 86 and the extent of the end face 72 of the push-rod piece 48, as measured in the same direction, are calculated to be sufficiently large to ensure that the effective length L1 of the arm 34 actuating the front-axle master cylinder 17 can be reduced to approximately ½ of its maximum effective length, with the additional understanding that even more extreme variations of the ratio L1/L2 are possible.

In contrast to the diagrammatic representation of FIG. 1 for exemplary purposes surface of the piston 88 of the actuating drive cylinder 86 which can be subjected to pressure should be clearly smaller than the effective piston surface F1 of the piston 28 of the front-axle master cylinder in order to keep the brake-fluid volume necessary for controlling the drive cylinder 86 small in relation to that quantity of brake fluid which has to be positively displaced into the front-axle brake circuit I for building up a maximum brake pressure.

To explain further possible embodiments of the brake unit 16 of the present invention without departing from its spirit, reference will now be made to FIG. 3. The same reference symbols are used in this embodiment as in FIG. 1 and/or 2, to indicate a constructional and functional identity or similarity of the identically designated parts and also to refer to the relevant parts of the description regarding FIGS. 1 and 2.

Figure 3:
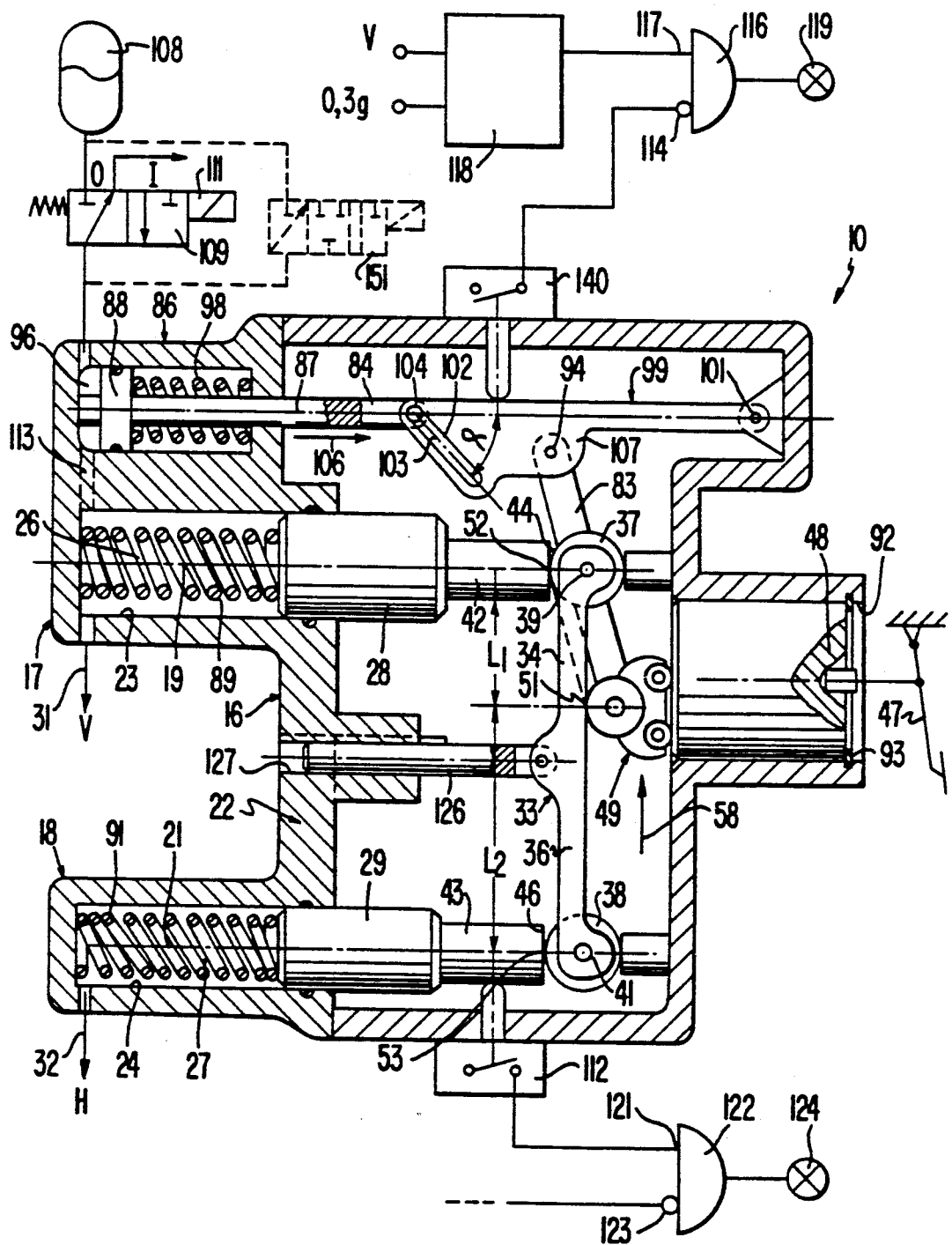
FIG. 3 is a partial cross-sectional view similar to FIG. 1 but of a further exemplary embodiment of a twin master cylinder according to the present invention, to explain additional features.

In the embodiment of the present invention according to FIG. 3, the hydraulic drive cylinder 86 provided as a servomotor for the lateral deflection of the supporting element 49 is arranged laterally next to the master cylinder 17 of the front-axle brake circuit I, with its central longitudinal axis 87 disposed at right angles to the direction of deflection 58 of the supporting element 49 or, in other words, parallel to the central longitudinal axes 19, 21 of the master cylinder 17, 18. To convert the longitudinal displacement movements of the piston 88 and of its piston rod 84 taking place along this axis 87 into transverse deflections of the supporting element 49, there is a pivotable slotted arm 99 which is mounted at a distance from the free end of the piston rod 84 on the housing 22 of the brake unit 16 so as to be pivotable about an axis 87 of the drive cylinder 86 at right angles and which is perpendicular to the transverse mid-plane 69 of the brake unit 16 marked by this central longitudinal axis 87 and the central longitudinal axes 19, 21 of the two master cylinder 17, 18. The slotted arm 99 can be produced as a flat tablet-shaped stamped steel part having a slot 102 formed by a long hole with a longitudinal mid-plane 103 located on the transverse mid-plane 69 of the brake unit 16 to form an angle o of approximately 45° with respect to the direction marked by the central longitudinal axis 87 of the drive cylinder 86.

The free end of the piston rod 84 of the drive cylinder 86 is equipped with a sliding pin 104 which is engaged in the long hole 102 and which itself extends perpendicularly relative to the transverse mid-plane 69 of the brake unit 16 and has a thickness corresponding, apart from the tolerance necessary for its slidability in the long hole 102, to the clear width of the long hole 102. With this design of the slotted arm 99 and arrangement of the drive cylinder 86, when the piston 88 moves in the direction of the arrow 106, to the right according to FIG. 3, the slotted arm 99 experiences a deflection in the clockwise direction about its pivot axis 101, because the drive-pressure space 96 of the drive cylinder 86 has been subjected to pressure, with the result that the middle region 107 of the slotted arm 99 laterally adjacent to the rocker 33 and arranged between the slot 102 and the pivot axis 101 effectively moves away itself from the rocker 33.

The link 83 is articulated on this middle region 107, in an arrangement similar to that of FIG. 1, which makes the motional coupling of the supporting element 49 with the displacement movements of the piston 88 of the drive cylinder 86. A slight difference, negligible in a first approximation, in the deflecting movements of the supporting element 49 according to FIG. 3 and of the supporting element 49 according to FIG. 1, is merely that the axis 94 of the joint connecting the link 83 to the slotted arm 99 executes a movement along the circular path concentric with the pivot axis 101 of the slotted arm 99, while in the embodiment according to FIG. 1 this pivot axis 94 moves exactly at the right angles to the, for example, central longitudinal axis 19 of the master cylinder assigned to the front-axle brake circuit I, when the drive cylinder 86 is subjected to or relieved of pressure. The embodiment according to FIG. 3 is thus far functionally equivalent to that according to FIG. 1, but differs insofar as there is a somewhat smaller space requirement in the lateral direction.

A further difference between the embodiment according to FIG. 1, and the embodiment according to FIG. 3 is that the feeding of drive or control pressure into the drive-pressure space 96 of the drive cylinder 86 takes place, under valve control, from an auxiliary-pressure source, present in any case on the vehicle, which, for the sake of simplicity in the illustration, is represented merely by a pressure accumulator 108 and which is presupposed to be maintained at a suitably high, constant outlet-pressure level.

As a control valve, there is a solenoid valve 109 which is designed as a 3/2-way valve and in the basic position 0 or which, assumed when the control magnet 111 is not energized, the drive-assumed pressure space 96 of the drive cylinder 86 is relieved towards the pressureless reservoir (not shown) of the auxiliary-pressure source 108 and the pressure accumulator 108 is shut off from the drive-pressure space 96. When the solenoid valve 109 is in the energized position I, the pressure accumulator 108 is connected to the drive-pressure space 96 of the drive cylinder and is shut off from the reservoir. Alternatively, an electrically actuatable 3/3-way solenoid value can be provided to control the connection of the space 96 to the pressure outlet of the auxiliary pressure source 108 or to the reservoir thereof and is arranged to be movable into a shut-off position to shut off the drive pressure space from both the pressure outlet and the reservoir.

The activation of the solenoid valve 109 appropriately takes place as a function of the vehicle deceleration, for example in such away that the solenoid valve 109 is changed over into its energized position I when a deceleration threshold value is exceeded. This method of activation can be carried out especially simply when the vehicle is equipped with an anti-lock system, since the vehicle deceleration can then take place as a result of an evaluation of the output signals from the wheel-speed sensors provided within the anti-lock system. Otherwise, a deceleration sensor or deceleration switch can be provided.

The change-over of the solenoid valve 109 can also be triggered by the output signal of a position transmitter or position switch 112, which, assuming a normal functioning of the brake system, responds to a specific position, linked to a 1 specific vehicle deceleration, of the piston 29 of the rear-axle master cylinder 18 and/or of the rocker arm 36 actuating the rear-axle master cylinder 18.

As an alternative to an activation control of the drive cylinder 86 by the outlet pressure of the auxiliary-pressure source 108, the drive cylinder 86 can also, as illustrated by the connecting channel 113 represented by broken lines, be subjected to the outlet pressure generated in the outlet-pressure space 26 of the front-axle master cylinder 17, in a functionally similar way to the embodiment according to FIG. 1.

Particularly where this design of the brake unit 16 is concerned, it is beneficial if there is also a switch 113 which responds to a minimum deflection of the slotted arm 99 and which thereby monitors the functioning capacity of the slotted arm 99 and of its drive cylinder 86.

In order, to obtain a warning signal which indicates a malfunction of the slotted arm 99, the output signal of the switch 113, appearing as a high-level signal when the latter responds, is fed to a first negated input 114 of a two-unit 117 receives the output signal of a comparator 118 which transmits a high-level output signal when the output signal when the vehicle deceleration determined, for example, from the output signals of wheel-speed sensors of an anti-lock system, exceeds a threshold value of, for example 0.3 g. The output signal of the AND element 116 is applied to a warning lamp 119 which lights up when the value of the vehicle deceleration is exceeded, but the switch 113 has not changed over.

The signal likewise appearing as a high-level voltage signal when the switch 112 assigned to the rear-axle master cylinder 18 responds is fed to a non-negated input 121 of a further two-input AND element 112 which, at a negated second input 123, receives the output signal of the comparator 118 or a functionally equivalent comparator. The lighting of a warning lamp 124 activated by the output signal of the AND element 122 is then an indication of a poor degree of venting or bleeding of the rear-axle brake circuit II.

In order to prevent the rocker 33 from sliding off from the master-cylinder pistons 28, 29, there is a guide bar 126 which is connected in an articulated manner to the rocker 33 between the support rollers 37, 38 and which is guided so as to be slidably displaceable in a guide bore 127 having a axis parallel to the master-cylinder bores 23, 24 of the housing 22 of the brake unit 16.

For a representative explanation of possible alternative designs of a brake unit 16 which works by a brake-pressure-controlled displacement of the supporting element 49 relative to the rocker 33, reference will now be made to FIG. 4a and 4b which qualitatively reproduce the trend of the brake pressure as a function of the pedal travel for different ratings of the restoring spring 89 of the drive cylinder 86. In each of the relevant graphs, the pedal travel Sp is plotted on the abscissa and the brake pressure P on the ordinate.

The graph of FIG. 4a applies qualitatively when the restoring spring 98 of the drive cylinder 86 has a prestress which is equivalent to a pressure of, for example, 20 bars, with the result that the piston 88 of the drive cylinder 86 remains 1 stationary from the start of a braking operation until after this pressure has built up in the outlet-pressure space 26 of the front-axle master cylinder 17 after the pedal travel Sl. Only "on the far side" of the pedal position Sl does the piston 88 of the drive cylinder 86 experience a displacement in the direction of the arrow 95 and the supporting element 49 an equidirectional displacement which leads to a growing increase in the actuating force acting on the piston 28 of the front-axle master cylinder 17. It is assumed that shifts of the supporting element 49 caused by pivoting movements of the link 83 do not appreciably influence the pedal-travel/brake pressure characteristic and that, in the illustrated basic position of the supporting element 49, a displacement and pivoting movement of the rocker 33 resulting from an axial displacement of the supporting element 49 leads to greater pressure rise in the rear-axle brake circuit II than in the front-axle brake circuit I. Up to the pedal travel Sl, the rear-axle brake pressure Pha is represented by the most steeply rising branch 131 of the Pha trend curve designed in general by the numeral 132, while the front-axle brake pressure Pva develops along the least steeply rising branch 133 of the Pva trend curve designed in general by numeral 134. After the prestress of the restoring spring 98 has been overcome from the pedal position Sl onwards, the rear-axle brake pressure develops along a less steeply rising branch 136 of its trend curve 132, and, from the pedal position Sl, the front axle brake pressure Pva develops along a branch 137 of its trend curve 134 which rises more steeply than the branch 136 of the Pha trend curve 132. As soon as a further displacement of the piston 88 of the drive cylinder 86 is prevented by a stop limitation, which would occur at the pedal position S2, in the graphical representation the brake pressures Pha and Pva develop further "in a straight line" with the gradients of their trend curves 132, 134 linked to this position S2.

The graph of FIG. 4b corresponds to an embodiment of the brake unit in which the restoring spring 98 of the drive cylinder 86 takes the form of a spring with a progressively increasing restoring force. Thus, the trend curve 138 "convex" in the representation of FIG. 4b is obtained for the rear-axle brake pressure Pha and the "flatly concave" trend curve 139 for the front-axle brake pressure Pva. Here too, the trend curves 138, 139 merge into straight lines of constant differing gradient from the stop limitation of the piston displacement.

A "stepwise" approximation to the trend form of the brake pressure which corresponds to the graph of FIG. 4b can also be obtained if, instead of a single restoring spring 98, there is series connection of two or more restoring springs which have different spring constants.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A twin master cylinder apparatus for a hydraulic dual-circuit brake system, comprising master cylinders assigned, respectively, to a front-axle brake circuit and to a rear-axle brake circuit and laterally spaced from each other in a common housing with parallel central longitudinal axes, a pivotable rocker having two arms for activating the master cylinder having a variable ratio of the lengths of the arms, a supporting element which, by a supporting point on the rocker, marks a pivot axis of the rocker and, by support on a push-rod piece, transmits an actuating force acting on the push rod piece to the rocker, the supporting element being arranged between the rocker and a supporting surface of the push-rod piece so as to be displaceable transversely relative to the direction of the actuating force and to the master-cylinder central longitudinal axes, and a hydraulic drive cylinder operatively coupled to the supporting element via a link so as to cause, when subjected to pressure, the link and the supporting element to experience a lateral deflection which reduces the ratio of the lengths of the arms, via which the actuating force is allocated to a piston of the master cylinder piston assigned to the front-axle brake circuit and to a piston of the master cylinder assigned to the rear-axle brake circuit.

2. The twin master cylinder arrangement according to claim 1, wherein a drive-pressure space of the drive cylinder controlling the lateral deflections of the supporting element is operatively arranged to be subjected to an outlet pressure of one of the two master cylinders.

3. The twin master cylinder arrangement according to claim 2, wherein the outlet pressure is the outlet pressure of the master cylinder assigned to the front-axle brake circuit.

4. The twin master cylinder arrangement according to claim 1, wherein a drive-pressure space of the drive cylinder is operatively arranged to be subjected to an outlet pressure, proportional to a force with which a vehicle driver actuates a brake pedal, of a brake valve of a hydraulic brake booster provided within the brake system.

5. The twin master cylinder arrangement according to claim 1, wherein a valve-controlled drive-pressure space of the drive cylinder is operatively arranged to be connected and subjected to an outlet pressure of a valve-controlled auxiliary-pressure source or to a pressureless reservoir of the auxiliary-pressure source.

6. The twin master cylinder arrangement according to claim 5, wherein a 3/2-way valve is provided for controlling a connection of the drive-pressure space to the outlet pressure of the auxiliary-pressure source or to the pressureless reservoir of the auxiliary-pressure source such that, in a basic position of the valve, the drive-pressure space is connected to the reservoir and is also shut off from the pressure outlet and the auxiliary-pressure source, and in an alternative functional position of the valve, the drive-pressure space is connected to the pressure outlet of the auxiliary-pressure source and also is shut off from the reservoir.

7. The twin cylinder arrangement according to claim 6, wherein the 3/2-way valve is a pressure-controlled valve actuatable by the outlet pressure of the master cylinder assigned to the front-axle brake circuit.

8. The twin master cylinder arrangement according to the claim 5, wherein an electrically actuatable 3/3-way solenoid valve is provided to control the alternative connection of the drive-pressure space of the drive cylinder to the pressure outlet of the auxiliary-pressure source or to the reservoir of the auxiliary-pressure source and is operatively arranged to be movable into a shut-off position, in which the drive-pressure space of the drive cylinder is shut off both from the pressure outlet of the auxiliary-pressure source and from the reservoir.

9. The twin master cylinder arrangement according to claim 1, wherein a restoring spring of the drive cylinder has a restoring force for displacing a piston in the drive cylinder and has a countering prestress which is equivalent to a fraction of between 1/10 and 1/5 of a maximum outlet pressure of the master cylinder assigned to the front-axle brake circuit.

10. The twin master cylinder arrangement according to claim 9, wherein a drive-pressure space of the drive cylinder controlling the lateral deflections of the supporting element is operatively arranged to be subjected to an outlet pressure of one of the two master cylinders.

11. The twin master cylinder arrangement according to claim 9, wherein a drive pressure space of the drive cylinder is operatively arranged to be subjected to an outlet pressure, proportional to a force with which a vehicle driver actuates a brake pedal, of a brake valve of a hydraulic brake booster provided within the brake system.

12. The twin master cylinder arrangement according to claim 9, wherein a valve-controlled drive-pressure space of the drive cylinder is operatively arranged to be connected and subjected to an outlet pressure of a valve-controlled auxiliary-pressure source or to a pressureless reservoir of the auxiliary-pressure reservoir of the auxiliary-pressure source.

13. The twin master cylinder arrangement according to claim 12, wherein a 3/2-way valve is provided for controlling a connection of the drive-pressure space to the outlet pressure of the auxiliary-pressure source or to the pressureless reservoir of the auxiliary-pressure source such that, in a basic position of the valve, the drive-pressure space is connected to the reservoir and is also shut off from the pressure outlet and the auxiliary-pressure source, and in an alternative functional position of the valve, the drive-pressure space is connected to the pressure outlet of the auxiliary-pressure source and also is shut off from the reservoir.

14. The twin master cylinder arrangement according to claim 13, wherein the 3/2-way valve is a pressure-controlled valve actuatable by the outlet pressure of the master cylinder assigned to the front-axle brake circuit.

15. The twin master cylinder arrangement according to claim 13, wherein an electrically actuatable 3/3-way solenoid valve is provided to the control the alternative connection of the drive-pressure space of the drive cylinder to the pressure outlet of the auxiliary-pressure source or to the reservoir of the auxiliary-pressure source and is operatively arranged to be movable into a shut-off position, in which the drive-pressure of the drive cylinder is shut off both from the pressure outlet of the auxiliary-pressure source and from the reservoir.

16. The twin master cylinder arrangement according to claim 1, wherein a restoring spring of the drive cylinder has a restoring force for displacing a piston in the drive cylinder for the supporting element and, exerts a progressively increasing restoring force with an increasing displacement of the piston.

17. The twin master cylinder arrangement according to claim 16, wherein a drive-pressure space of the drive cylinder controlling the lateral deflections of the supporting element is operatively arranged to be subjected to an outlet pressure of one of the two master cylinders.

18. The twin master cylinder arrangement according to claim 17, wherein in the position of the supporting element corresponding to the non-activated state of the brake system, an axial offset is provided between the plane which extends at right angles to the central longitudinal axes of the master cylinders and in which extends a pivot axis of a joint coupling the link to a slotted arm and the supporting point, which axial offset corresponds to between about 1/10 and ¼ of a maximum actuating stroke of the push-rod piece, the pivot axis being at a breaker axial distance from an end face of the push-rod piece than the supporting point of the supporting element on the rocker.

19. The twin master cylinder according to claim 16, where a drive-pressure space of the drive cylinder is operatively arranged to subjected to an outlet pressure, proportional to a force with which a vehicle driver actuates a brake pedal, of a brake valve of a hydraulic brake booster provided within the brake system.

20. The twin master cylinder arrangement according to claim 16, wherein a valve-controlled drive-pressure space of the drive cylinder is operatively arranged to be connected and subjected to an outlet pressure of a valve-controlled auxiliary-pressure source or to a pressureless reservoir of the auxiliary-pressure source.

21. The twin master cylinder arrangement according to claim 20, wherein a 3/2-way valve is provided for controlling a connection of the drive-pressure space to the outlet pressure of the auxiliary-pressure source or to the pressureless reservoir of the auxiliary-pressure source such that, in a basic position of the valve, the drive-pressure space is connected to the reservoir and is also shut off from the pressure outlet and the auxiliary-pressure source, and in an alternative functional position of the valve, the drive-pressure space is connected to the pressure outlet of the auxiliary-pressure source and also is shut off from the reservoir.

22. The twin master cylinder arrangement according to claim 21, wherein the 3/2-way valve is a pressure-controlled valve actuatable by the outlet pressure of the master cylinder assigned to the front-axle brake circuit.

23. The twin master cylinder arrangement according to claim 21, wherein an electrically actuatable 3/3-way solenoid valve is provided to control the alternative connection of the drive-pressure space of the drive cylinder to the pressure outlet of the auxiliary-pressure source or to the reservoir of the auxiliary-pressure source and is operatively arranged to be movable into a shut-off position, in which the drive-pressure space of the drive cylinder is shut off both from the pressure outlet of the auxiliary pressure source and also is shut off from the reservoir.

24. The twin master cylinder arrangement according to claim 16, wherein a restoring spring of the drive cylinder has a restoring force for displacing a piston in the drive cylinder and has a countering prestress which is equivalent to a fraction of between 1/10 and 1/5 of a maximum outlet pressure of the master cylinder assigned to the front-axle brake circuit.

25. The twin master cylinder arrangement according to claim 1, wherein the drive cylinder has a central longitudinal axis extending in the same plane as the central longitudinal axes of the two master cylinders, and at right angles to the two master cylinders.

26. The twin master cylinder arrangement according to claim 1, wherein the drive cylinder has a central longitudinal axis extending parallel to the central longitudinal axes of the two master cylinders, and a deflection device operatively couples a piston rod of a piston of the drive-cylinder piston to the link and converts longitudinal piston-rod movements into movements of the link and transverse movements of the supporting element.

27. The twin master cylinder arrangement according to claim 26, wherein the deflection device comprises an arm with a slot and is pivotable about an axis and arranged at a distance from the free end of the piston rod so as to insersect the central longitudinal axis of the drive cylinder at right angles and extend perpendicularly relative to a transverse mid-plane of the twin master cylinder arrangement, the slot comprising a long hole which extends in or parallel to the transverse mid-plane and which is oblique relative to the longitudinal axis of the drive cylinder, and a sliding pin arranged at the end of the piston rod is in engagement with the slot, the link being articulated on the middle region of the slotted arm between its pivot axis and the slot, and the slot inclination relative to the direction of displacement of the piston rod of the drive cylinder being such that, as a result of a reduction of the distance between the pivot pin and the pivot axis, the slotted arm experiences a deflection directed away from the adjacent front-axle master cylinder and the supporting element is moved nearer to the central longitudinal axis of the front-axis cylinder.

28. The twin master cylinder arrangement to claim 1, wherein the supporting point at which the actuating force is exerted on the rocker is marked by a supporting point of a roller mounted freely rotatably about an axis on the moveable supporting element, and the supporting element is supported on a plane end face of the push-rod piece via two freely rotatable support rollers having axes of rotation arranged at a distance from one another on both sides of longitudinal mid-plane of the supporting element containing the rotation axis of the roller located adjacent the rocker.

29. The twin master cylinder arrangement according to claim 1, wherein, in the position of the supporting element corresponding to the non-actuated state of the brake system, an axial offset is provided between the plane which extends at right angles to the central longitudinal axes of the master cylinders and in which extends a pivot axis of a joint coupling the link to a piston rod of the drive cylinder or to a slotted arm, and the supporting point of the supporting element on the rocker which corresponds to between about 1/10 and ¼ of a maximum actuating stroke of the push-rod piece, the pivot axis being at a greater axial distance from an end face of the push-rod piece than the supporting point of the supporting element on the rocker.

30. The master cylinder arrangement according to claim 1, wherein there are provided a first path transmitter or path-dependent switch to transmit an output signal from a minimum amount of lateral deflection of the supporting element, a comparator to transmit an output signal when the vehicle deceleration reaches a minimum value, and a logic element to generate a warning signal as a result of a combination of the output signals of the path transmitter and the comparator when the comparator output signal appears but the path transmitter switch has not responded.

31. The master cylinder arrangement according to claim 30, wherein there are provided a second path transmitter to transmit an output signal as soon as the piston of the master cylinder assigned to the rear-axle brake circuit has executed a part stroke corresponding to a specific fraction of ¼ to ⅓ of its maximum stroke, and a logic element to generate, as a result of a combination of the output signal of the second path transmitter with the output signal of one of the comparator or a further comparator transmitting an output signal from a minimum deceleration of the vehicle, a warning signal when the output signal characteristic of the minimum stroke of the master-cylinder piston appears but the comparator has not responded.

* * * * *